(12) United States Patent
Muramatsu et al.

(10) Patent No.: US 7,394,004 B2
(45) Date of Patent: Jul. 1, 2008

(54) KEY STRUCTURE

(75) Inventors: Shigeru Muramatsu, Shuchi-gun (JP); Toshiro Sakai, Hamamatsu (JP)

(73) Assignee: Yamaha Corporation (JP)

( * ) Notice: Subject to any disclaimer, the term of this patent is extended or adjusted under 35 U.S.C. 154(b) by 13 days.

(21) Appl. No.: 11/378,479

(22) Filed: Mar. 20, 2006

(65) Prior Publication Data

US 2006/0254892 A1    Nov. 16, 2006

(30) Foreign Application Priority Data

Mar. 23, 2005    (JP)    ............................ P2005-084883

(51) Int. Cl.
*G10C 1/00*    (2006.01)
(52) U.S. Cl. .......................................... 84/174; 84/433
(58) Field of Classification Search .............. 84/423 R, 84/171, 433, 438
See application file for complete search history.

(56) References Cited

U.S. PATENT DOCUMENTS 4,346,639 A    8/1982    Vagias
5,509,344 A    4/1996    Calabrese et al.
5,515,763 A  *  5/1996    Vandervoort .................. 84/433
6,133,518 A  *  10/2000   Kamimura et al. ........ 84/423 R

FOREIGN PATENT DOCUMENTS

EP    0 465 356 A2    1/1992
JP    8-179756    7/1996
JP    2000-276161    10/2000

OTHER PUBLICATIONS

European Search Report dated May 23, 2006.

* cited by examiner

*Primary Examiner*—Kimberly Lockett
(74) *Attorney, Agent, or Firm*—Dickstein, Shapiro, LLP.

(57) ABSTRACT

A key structure includes a top plate which is formed by laminating a half-transparent resin surface layer member on a resin bottom side member using two-color injection molding, and the top plate is secured on a wooden key base. A plurality of concave grooves and protrusions, and a plurality of protrusion and troughs are respectively formed together in straight lines in the long direction of the key structure on a rear face of the surface layer member and a top face of the rear side member. Outside light is reflected from the top ends of the protrusion and the troughs, whereby a faint and natural vertically-striped pattern, which corresponds to a concave-convex part formed by the concave grooves and the protrusions, is perceived as resembling an edge grain of ivory.

9 Claims, 9 Drawing Sheets

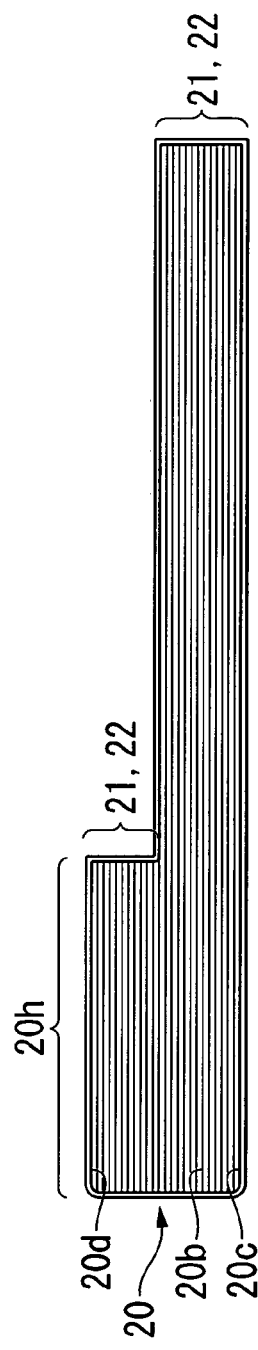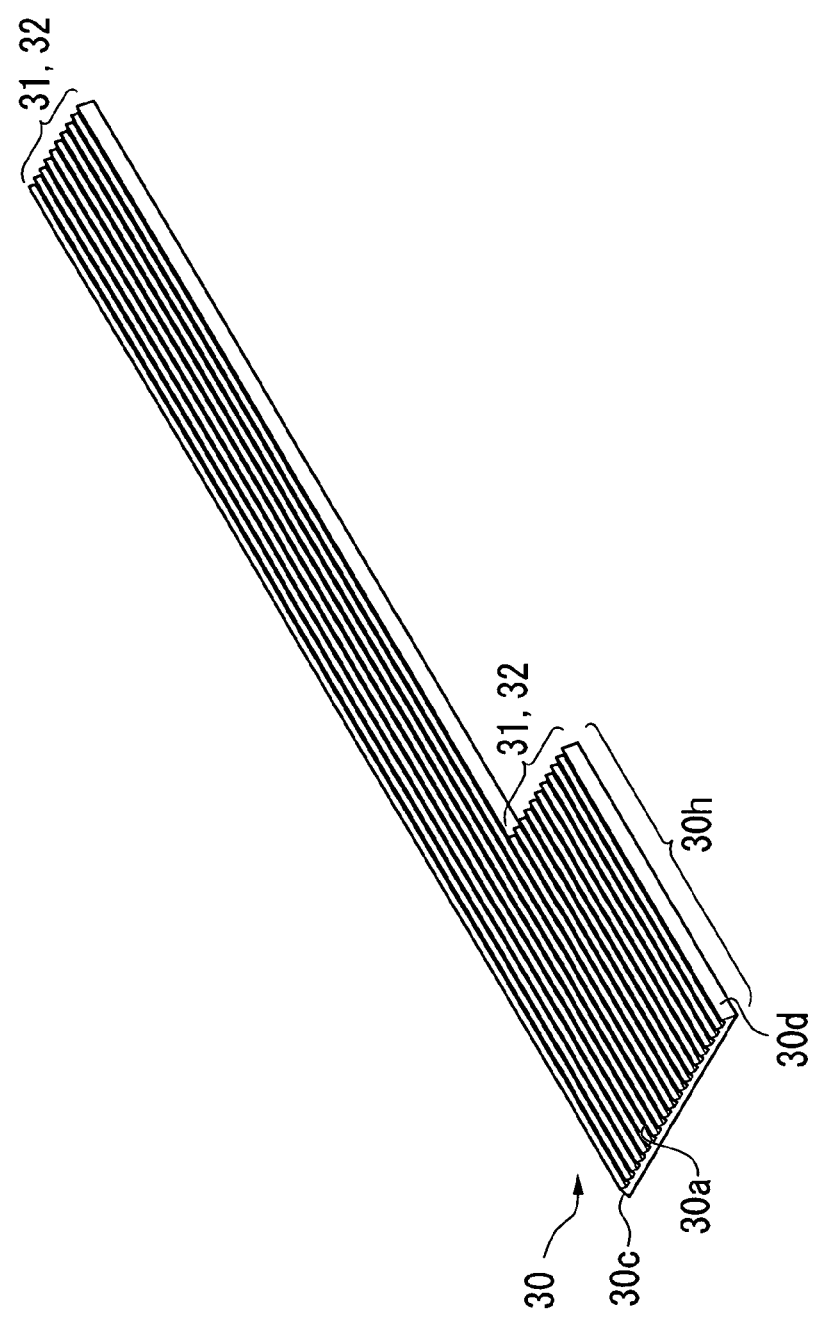
FIG. 2A
FIG. 2B

KEY STRUCTURE

BACKGROUND OF THE INVENTION

1. Field of the Invention

The present invention relates to a key structure which functions as a key which is attached to a keyboard apparatus and is rotated by push down and release operation.

Priority is claimed from Japanese Patent Application No. 2005-84883, filed Mar. 23, 2005, the content of which is incorporated herein by reference.

2. Description of Related Art

In the past, ivory has been used as a material for a key structure of a keyboard apparatus. A key structure using ivory has an excellent tactile sensation against the fingers; moreover, flat grain and edge grain patterns in the ivory are faintly visible on the surface of the key, imparting a special sense of sophistication to its appearance. However, for reasons of wildlife conservation, the use of ivory is banned in recent years.

In Japanese Unexamined Patent Application, First Publication, No. 8-179756 (JP-A 08-179756), concave grooves resembling the flat grain pattern of ivory are formed in the surface of a resin key structure, such that its tactile sensation and its appearance are similar to ivory.

In Japanese Unexamined Patent Application, First Publication, No. 2000-276161 (JP-A 2000-276161), letters and the like such as the pitch are printed in a rear face of a key structure. After the key structure is pushed down, an illuminating light is transmitted through the key structure from below, enabling the letters and the like to be seen from the surface side.

However, in JP-A 08-179756, the faint pattern of ivory cannot be realized since the key structure pattern consists of concave grooves in the surfaces. The appearance is clearly different to a key structure made from real ivory, and does not achieve a sufficient sense of sophistication.

In JP-A 2000-276161, the letters and the like are only visible after push down operation and not at other times. Unlike the natural patterns of ivory, the letters and the like cannot be viewed at all times since they must be illuminated by light from below in order to view them.

SUMMARY OF THE INVENTION

The present invention has been realized in order to solve the conventional problems mentioned above. It is an object of this invention to provide a key structure having a faint natural pattern such as that of ivory which can be viewed at all times.

In order to achieve the above objects, this invention provides a key structure which, when attached to a keyboard apparatus, functions as a key which rotates by push down and release operation by a player. The key structure comprises a key base which is key-shaped in plan view, a resin top plate which has a surface for fingering of the resin top plate and is secured on a top face of the key base, and a striped patterning layer formed in a section of the resin top plate between the surface for fingering and the top face of the key base in which portions having different reflectance properties with respect to light incident on the surface for fingering are alternately arranged. At least a section of the top plate above the striped patterning layer is half-transparent, such that the striped patterning layer can be perceived as a pattern from the surface for fingering side.

Preferably, a concave-convex part is formed as the striped patterning layer on an opposing face of the top plate opposite the key base. Alternatively, the top plate may be formed by laminating a plurality of thin plate members, and the concave-convex part is formed on at least one of two opposing faces of at least one pair of mutually opposing thin plate members among the plurality of thin plate members.

The striped patterning layer may alternatively include a combination of concave grooves and protrusions. Also, the striped patterning layer may be formed by a plurality of hollow portions. Further, the striped patterning layer may be formed by a pattern film including transparent parts and black parts which alternate with the transparent parts.

According to this invention, a faint and natural pattern which resembles the pattern of ivory or the like can always be perceived as the external appearance.

BRIEF DESCRIPTION OF THE DRAWINGS

FIG. 2A is a rear view showing a surface layer member which forms a top plate used in the first embodiment of this invention;

FIG. 2B is a perspective view showing a bottom side member which forms a top plate used in the first embodiment of this invention;

DETAILED DESCRIPTION OF THE INVENTION

First Embodiment

Figure 1:
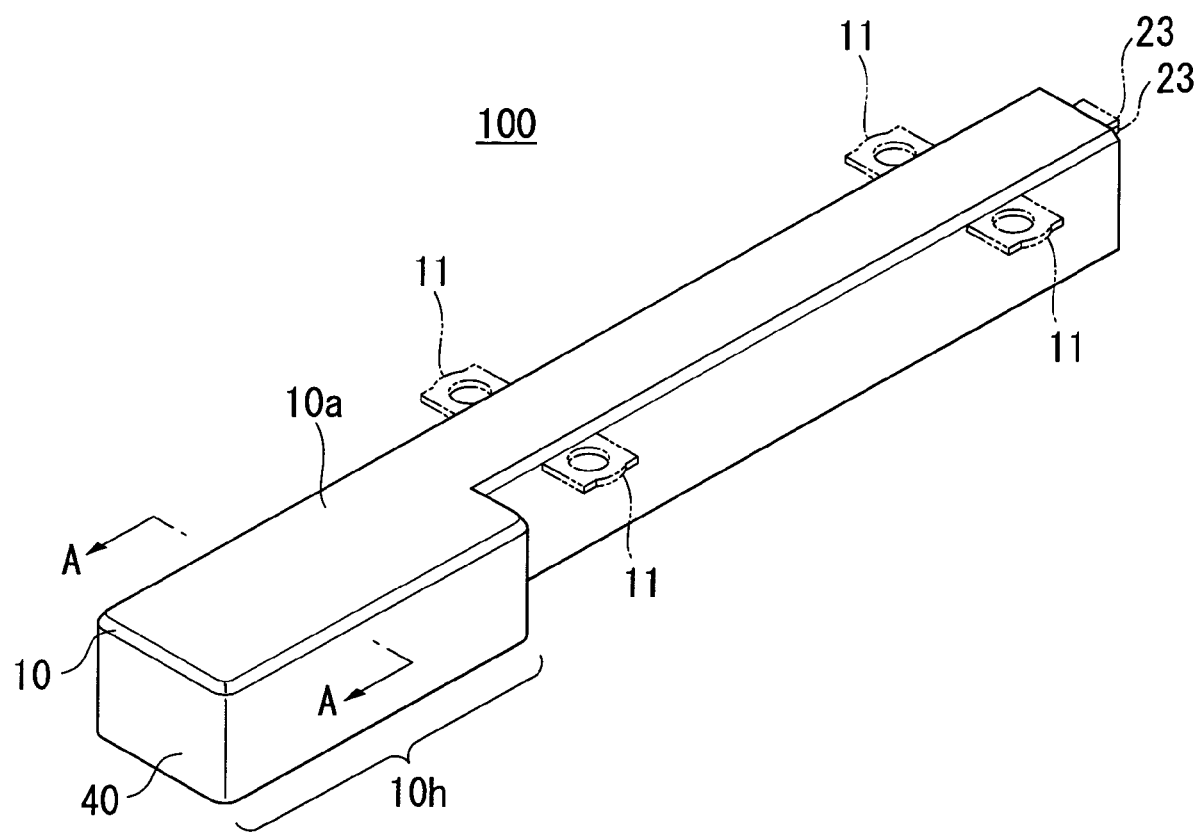
FIG. 1 is a perspective view showing a key structure according to a first embodiment of this invention.

FIG. 1 is a perspective view of a key structure according to a first embodiment of the invention. A key structure 100 of this embodiment functions as a key which, when attached to an unillustrated keyboard apparatus, rotates by push down and release operation by a player. While in this embodiment, the key structure 100 is applied to a white key having a pitch C by way of example, its basic configuration is the same when applied to other white keys, the only difference being the shape. The key structure 100 is formed by securing a top plate 10 on a wooden key base 40 which has a white key shape in plan view. A top face of the key structure 100 is a surface 10a for fingering of the top plate 10. The surface 10a of the top plate 10 is fingered by a player with the surface of a broad part 10h mainly being fingered.

Figure 3A:
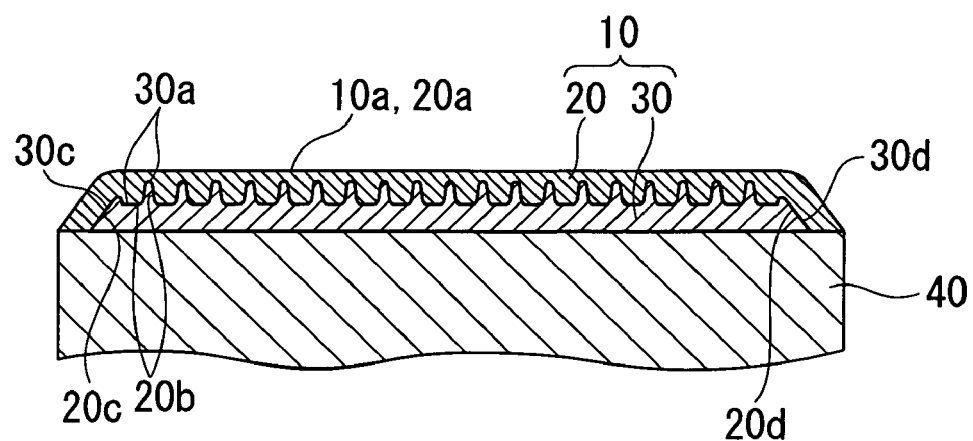
FIG. 3A is a cross-sectional view taken along the line A-A of FIG. 1.
Figure 3B:
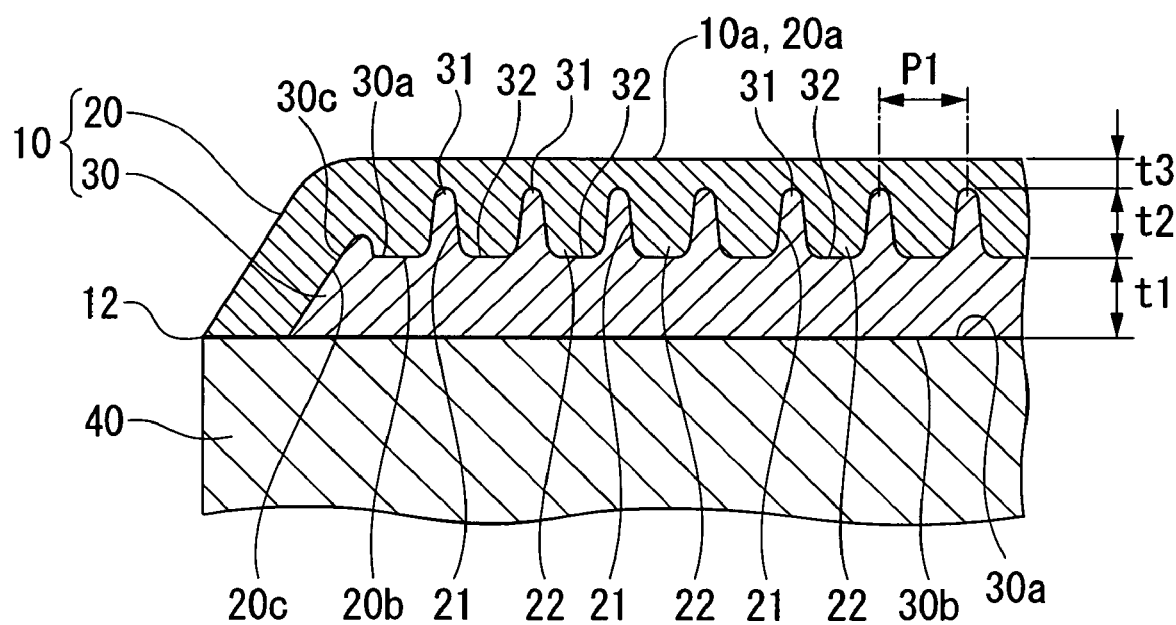
FIG. 3B is an enlarged cross-sectional view of FIG. 3A.

FIG. 2A is a rear view of a surface layer member which forms the top plate 10, and FIG. 2B is a perspective view of a bottom side member which forms the top plate 10. FIG. 3A is a cross-sectional view taken along the line A-A of FIG. 1, and FIG. 3B is an enlarged cross-sectional view of the same.

As shown in FIG. 3A, the top plate 10 is formed using two-color injection molding (explained below) on a thin plate-like bottom side member 30 shown in FIG. 2B, in a laminated formation of a thin plate-like surface layer member 20 shown in FIG. 2A. As shown in FIG. 3B, a rear face 30b of the bottom side member 30 consisting of the rear face of the top plate 10 is secured to a top face 40a of the key base 40 using an adhesive 12, thereby completing the key structure 100.

Gate-corresponding parts 23 and 33 of the top plate 10 in FIG. 1 are residual walled parts corresponding to a gate, which functions as an influx hole for introducing molten resin into a cavity when forming the surface layer member 20 and the bottom side member 30 by injection molding (explained below). Four mold-shaped clips 11 are molded onto the bottom side member 30 to hold it in the mold during the injection molding. All these parts are removed by cutting and the like in a final completion step.

As shown in FIG. 3A, a top face 20a of the surface layer member 20 is also the surface 10a for fingering of the key structure 100 or the top plate 10. As shown in FIG. 2A, a plurality of concave grooves 21 and protrusions 22 are formed together in the rear face 20b of the surface layer member 20. As shown in FIG. 2B, a plurality of protrusions 31 and troughs 32 are formed together in the top face 30a of the bottom side member 30. The pluralities of concave grooves 21, protrusions 22, protrusions 31, and troughs 32 extend in straight lines in the long direction of the key structure 100, some of them being formed within range of a broad part 20h and a broad part 30h which correspond to the broad part 10h and others being formed along approximately the entire long direction of the key structure 100.

More specifically, as shown in FIGS. 3A and 3B, the protrusions 31 and the troughs 32 are formed in the top face 30a of the bottom side member 30, and alternate in the key width direction. The concave grooves 21 and the protrusions 22 are formed in the rear face 20b of the surface layer member 20, and alternate in the key width direction. The protrusions 31 correspond to the concave grooves 21 and the troughs 32 correspond to the protrusions 22, these being respectively joined together.

Sloping faces 30c and 30d (see FIG. 2B and FIG. 3A) are formed on the left and right sides of the bottom side member 30, and sloping faces 20c and 20d (see FIG. 2B and FIG. 3A) which correspond to the sloping faces 30c and 30d are formed in the surface layer member 20, such that the surface layer member 20 covers the bottom side member 30 from the top, left, and right sides. The sloping faces 30c and 30d directly contact the sloping faces 20c and 20d, making the contacting faces of the surface layer member 20 and the bottom side member 30 less likely to become unstuck with respect to outward pressure in the key width direction (left-right direction), and increasing the strength of the top plate 10 in the key width direction. While not illustrated in the diagrams, the bottom side member 30 and the surface layer member 20 have the same shapes in the front side and rear side parts of the top plate 10 as the sloping faces 30c and 30d and the sloping faces 20c and 20d, increasing their strength in the front-rear direction.

The pitch p1 of the protrusions 31 and the concave grooves 21 is approximately 1 mm, and the nose R of the top end of the protrusions 31 is approximately 0.1 mm. If the thickness of the bottom side member 30 from its rear face 30b to its top face 30a is expressed by t1, the thickness from the top face 30a to the protrusions 31 is t2, and the thickness of the surface layer member 20 from the root position of the concave grooves 21 to the top face 20a is t3, then these thickness are set approximately to t1=0.85 mm, t2=0.65 mm, and t3=0.3 to 0.4 mm.

The material used for the surface layer member 20 is made by adding a filler to a polymethylmethacrylate (PMMA) resin. The color of the surface layer member 20 is an ivory-white which closely resembles the color of ivory, and it is half-transparent. A transparent polycarbonate (PC) resin is used as the material for the bottom side member 30.

In this configuration, when the key structure 100 is attached to an unillustrated keyboard apparatus and placed in a normal environment of indoor light and the like, some of the light which is incident on the top plate 10 from the outside passes into the surface layer member 20, is reflected from the contact face between the surface layer member 20 and the bottom side member 30, passes again through the surface layer member 20, and is emitted to the outside. Due to the half-transparency of the surface layer member 20 and the difference between its thickness and t3 (t2+t3), the light which is reflected from the top ends of the protrusions 31 has a different brightness than the light which is reflected from the troughs 32, the light which is reflected from the top ends of the protrusions 31 being brighter. This produces a visible vertically-striped pattern which corresponds to the 'convex-concave part' formed by the concave grooves 21 and the protrusions 22 (and between the protrusions 31 and the troughs 32). Moreover, since the surface layer member 20 is half-transparent, the light passing through it is moderately dispersed. This blurs the outline of the convex-concave part as viewed from the surface 10a for fingering side, giving the vertically-striped pattern a faint and natural appearance which, to the user, resembles the edge grain of real ivory.

Subsequently, a method for molding the top plate 10 will be explained. FIGS. 4A to 4D are schematic diagrams of a two-color injection molding procedure of the surface layer member 20.

Figure 4A:
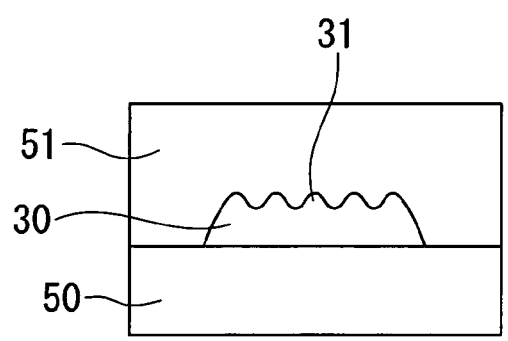
FIGS. 4A to 4D are cross-sectional views showing procedures for two-color injection molding of a top plate used in the first embodiment of this invention.
Figure 4B:
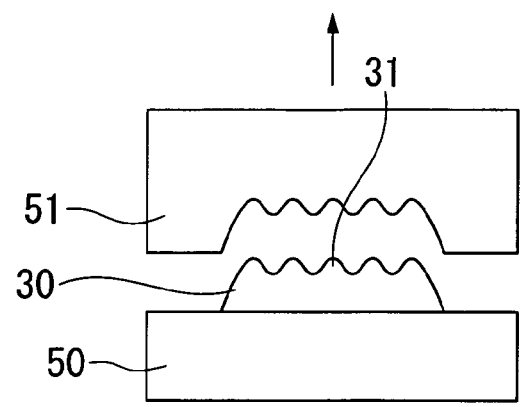
Figure 4C:
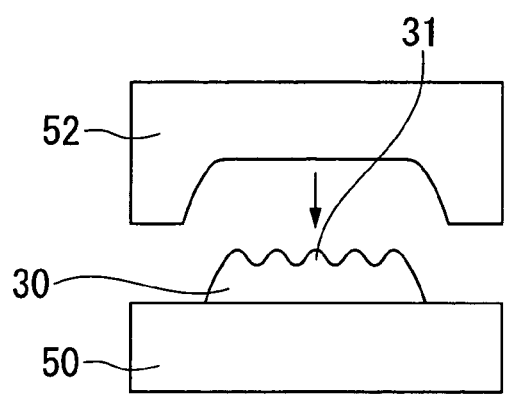

Firstly in FIG. 4A, a core mold 50 is aligned with a first movable mold 51 and PC molten resin is introduced into a cavity, whereby a primary molded component consisting of the bottom side member 30 is formed by injection molding. The top side of FIG. 4A is the top face side of the bottom side member 30. In FIG. 4B, the first movable mold 51 is removed, and replaced with a second movable mold 52 which is moved near to the core mold 50 (FIG. 4C). To facilitate this switch from the first movable mold 51 to the second movable mold 52 in this embodiment, the first movable mold 51 is provided above the core mold 50 and the second movable mold 52 is provided below. When shifting from the state of FIG. 4B to that of FIG. 4C, the core mold 50 is rotated by 90 degrees so that its cavity side is facing-downwards. The four mold-shaped clips 11 (see FIG. 1) of the bottom side member 30 hold the bottom side member 30 on the core mold 50 and prevent it from slipping off.

Figure 4D:
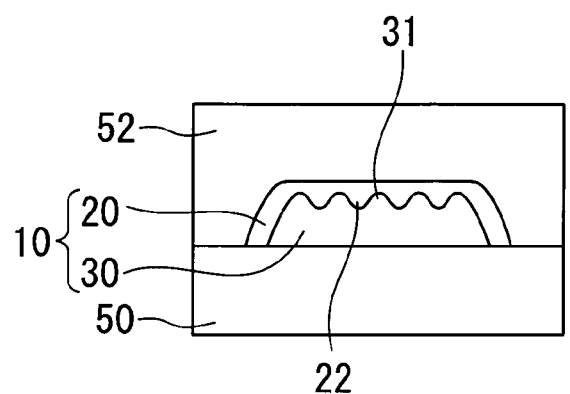

In FIG. 4D, the core mold 50 is aligned with the second movable mold 52 while still holding the bottom side member 30, and PMMA molten resin is introduced into the cavity formed by a gap between the second movable mold 52 and the bottom side member 30, whereby a secondary molded component consisting of the surface layer member 20 is formed by injection molding. The bottom side member 30 and the surface layer member 20 are joined in a single piece which surrounds a concave-convex part. Since the sections of the first and second movable molds 51 and 52 which correspond to the protrusions 31 and 22 extend in vertical straight lines, the PC and PMMA resins introduced through the gates can easily fill the entire cavity without blocking and therefore more smoothly than when these sections are curved. The shapes of the first and second movable molds 51 and 52 are faithfully reflected in the shapes of the protrusions 31, the troughs 32, the protrusions 22, and the concave grooves 21, ensuring that there are no empty gaps in the top plate 10 and achieving a beautiful ivory-like pattern.

As described above, after the gate-corresponding parts 23 and 33 and the mold-shaped clips 11 have been removed from the top plate 10, the adhesive 12 is used to affix the rear face 30b of the bottom side member 30 to the top face 40a of the key base 40, completing one key structure 100. Since the rear face 30b of the bottom side member 30 is flat, it has good adhesive strength with respect to the key base 40.

According to this embodiment, since the concave-convex part formed in the top plate 10 appears patterned through the half-transparent surface layer member 20, its external appearance always resembles the faint and natural pattern of ivory and the like without needing to irradiate light from below. Therefore, the user perceives it as real ivory with a sophisticated appearance.

Since the top plate 10 is manufactured by injection molding, it is easy to manufacture. Since the thickness t3 must be set to a small value of between 0.3 mm and 0.4 mm to enable the striped pattern to be easily perceived, the surface layer member 20 itself is extremely thin. However, two-color molding is performed to firmly join the surface layer member 20 to the bottom side member 30, so that the low rigidity of the surface layer member 20 itself is not a problem, and the thickness t1 of the bottom side member 30 is maintained as above to ensure that the overall top plate 10 has high rigidity.

To make the external appearance resemble an ivory pattern, the degree of half-transparency of the surface layer member 20 should preferably be set such that light reflected by the top ends of the plurality of protrusions 31 appears to have a width of approximately 0.25. However, since the degree of half-transparency is also related to the balance with the value of the thickness t3, combinations of the two should be tested to determine the best combination. This will make it possible to obtain many types of sophisticated external appearances.

Second Embodiment

While in the first embodiment, the top plate 10 has a two-layer structure, in a second embodiment, the section corresponding to the top plate 10 has a one-layer structure. Since the external appearance of the key structure of the gate insulating film 2 is identical to that of the key structure 100, the overall external perspective view is the same as FIG. 1.

Figure 5A:
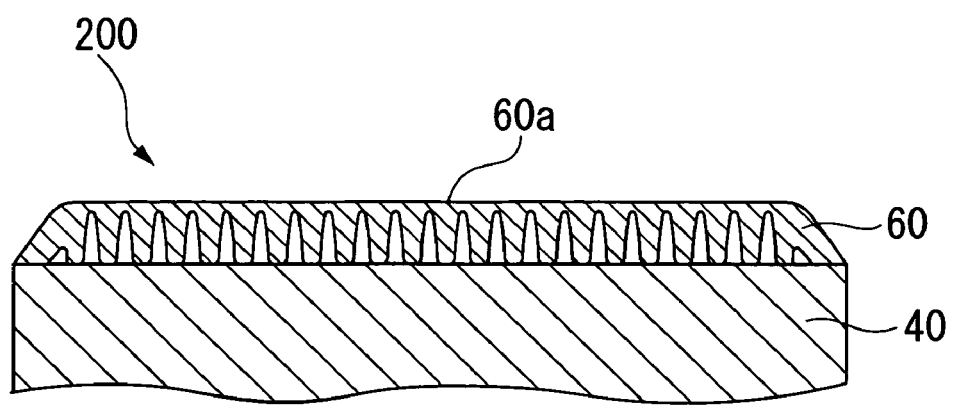
FIG. 5A is a cross-sectional view showing a key structure according to a second embodiment of this invention, taken along the line A-A in FIG. 1.
Figure 5B:
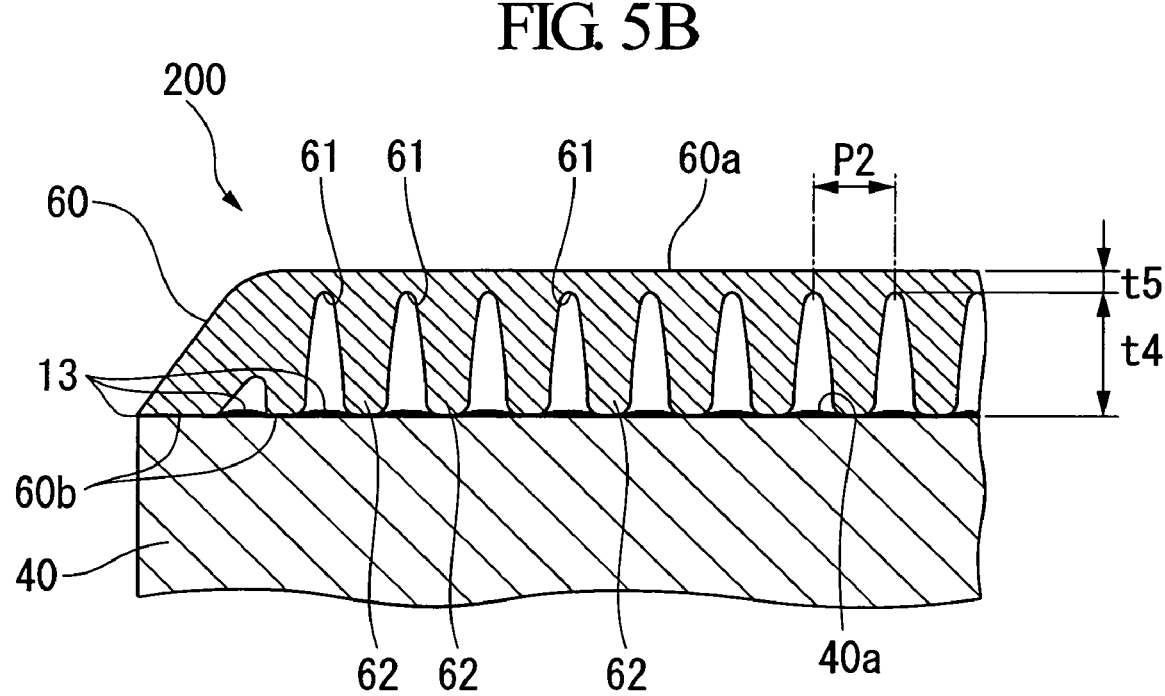
FIG. 5B is an enlarged cross-sectional view of FIG. 5A.

FIGS. 5A and 5B are, respectively, a cross-sectional view and an enlarged cross-sectional view of a key structure 200 of the second embodiment taken along the line A-A of FIG. 1, and correspond to FIGS. 3A and 3B. The key structure 200 is made by securely fixing a top plate 60 on the key base 40 using an adhesive 13. A top face 60a of the top plate 60 is a surface for fingering of the key structure 200.

The top plate 60 is molded from the same material as the surface layer member 20 by single-color injection molding; it is the same color as the surface layer member 20 and half-transparent. A plurality of protrusions 62 and concave grooves 61 are formed together in a rear face 60b of the top plate 60, the protrusions 62 and the concave grooves 61 intersecting each other in the key width direction. These pluralities of the protrusions 62 and the concave grooves 61 extend in straight lines in the long direction of the key structure 200, in the same manner as the protrusions 22 and the concave grooves 21 (see FIG. 3B).

The pitch p2 between the concave grooves 61 is approximately 1 mm, and the size R of the root (top end) of the concave grooves 61 is approximately 0.1 mm. Although not clearly shown in FIGS. 5A and 5B, a flat part having a width of approximately 0.11 mm is provided at the bottom ends of the protrusions 62 in order to ensure the adhesion area. When t4 represents the thickness from the rear face 60b to the root position of the concave grooves 61, and t5 represents the thickness from the root position of the concave grooves 61 to the top face 60a, these are set to approximately t4=1.5 mm and t5=0.3 mm to 0.4 mm.

After molding, the injection-molded top plate 60 is processed according to predetermined post-processing, and its rear face 60b is affixed by the adhesive 13 to the top face 40a of the key base 40 to complete the key structure 200. Since the flat parts at the bottom ends of the protrusions 62 have a narrow area, an adhesive with high viscosity is used as the adhesive 13 in order to maintain adhesive strength with the key base 40. After affixing the rear face 60b, the adhesive 13 runs over slightly into the concave grooves 61.

In the key structure 200 of this configuration, the level of light-transmission and light-reflection is different in the thick part of the half-transparent white resin and in the rear face 60b of the top plate 60, making them appear different when viewed from the outside. That is, due to the half-transparency of the top plate 60 and the mixing of white filler and the like, the difference between the thickness t4 and the thickness t5 makes the positions corresponding to the protrusions 62 appear brighter than the positions corresponding to the concave grooves 61. Therefore, a faint and natural vertically-striped pattern is visible in correspondence with the concave-convex part formed by the concave grooves 61 and the protrusions 62, giving the appearance of the edge grain pattern of real ivory.

Figure 6A:
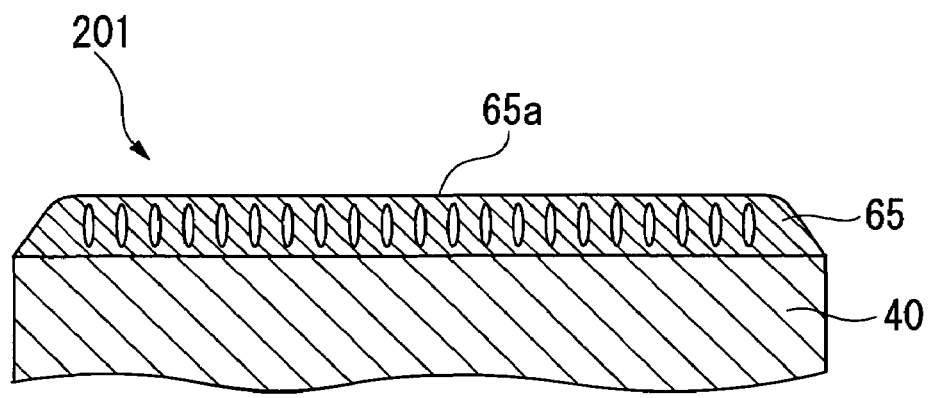
FIG. 6A is a cross-sectional view showing a key structure according to an alternative example of the second embodiment of this invention, taken along the line A-A in FIG. 1.
Figure 6B:
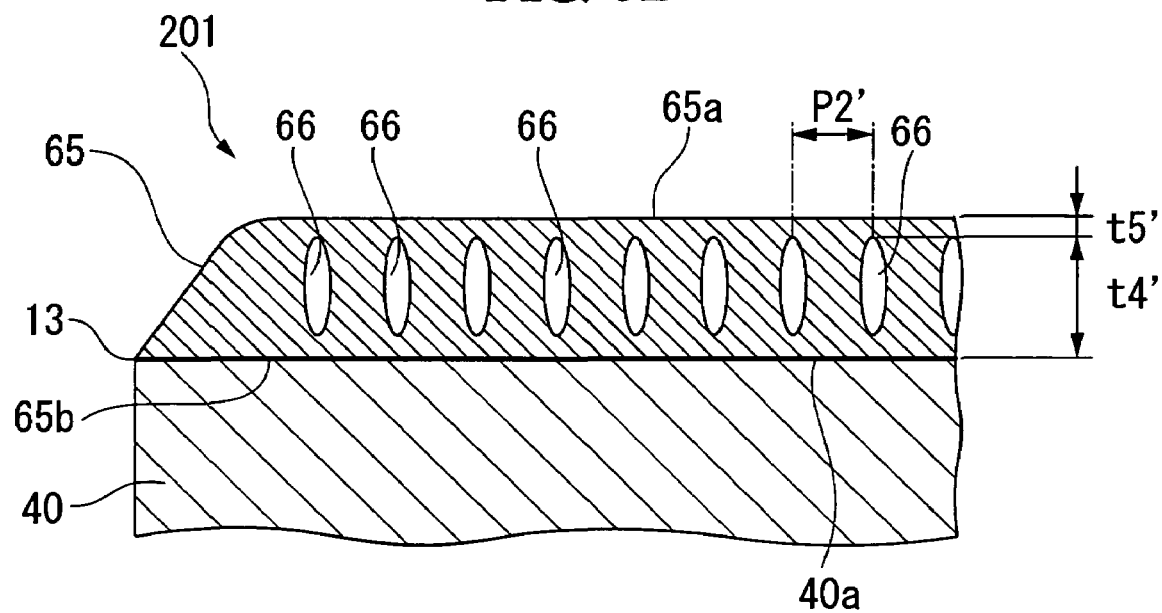
FIG. 6B is an enlarged cross-sectional view of FIG. 6A.

FIGS. 6A and 6B show a key structure 201 according to an alternative example of the second embodiment of this invention. A top plate 65 is molded from the same material as the surface layer member 20 by single-color injection or extrusion molding; it is the same color as the surface layer member 20 and half-transparent. A plurality of hollow portions 66 are formed between a rear face 65b and a top face 65a of the top plate 65 in the key width direction. These pluralities of the hollow portions 66 extend in straight lines in the long direction of the key structure 201, in the same manner as the concave grooves 61 in the aforementioned second embodiment (see FIG. 5B).

The pitch p2' between the hollow portions 66 is approximately 1 mm, and the size R of the root (top end) of the hollow portions 66 is approximately 0.1 mm. When t4' represents the thickness from the rear face 65b to the top end of the hollow portions 66, and t5' represents the thickness from the top end of the hollow portions 66 to the top face 65a, these are set to approximately t4'=1.5 mm and t5'=0.3 mm to 0.4 mm.

After molding, the injection- or extrusion-molded top plate 65 is processed according to predetermined post-processing, and its rear face 65b is affixed by the adhesive 13 to the top face 40a of the key base 40 to complete the key structure 201.

In the key structure 201 of this configuration, the level of light-transmission and light-reflection is different in the thick part of the half-transparent white resin and in the rear face 65b of the top plate 65, making them appear different when viewed from the outside. That is, due to the half-transparency of the top plate 65 and the mixing of white filler and the like, the difference between the thickness t4' and the thickness t5' makes the positions corresponding to portions between the hollow portions 66 appear brighter than the positions corresponding to the hollow portions 66. Therefore, a faint and natural vertically-striped pattern is visible in correspondence with the hollow portions 66, giving the appearance of the edge grain pattern of real ivory.

According to this embodiment, with regard to the sophisticated external appearance having a faint and natural pattern resembling that of ivory and the like, similar effects to those of the first embodiment can be obtained. In addition, since the top plate 60 or 65 is molded by single-color injection molding, the key structure 200 or 201 can be manufactured more easily than the first embodiment. Further, the concave grooves 61 and the hollow portions 66 enable thermal capacity and thermal conductivity of the top plate 60 and 65 to be lowered compared with the case where the top plate is formed by a solid resin. Accordingly, a player of the keyboard feels warm when he or she touches the surface for fingering of the key structure 200 and 201 even in a cold atmosphere.

In the first and second embodiments, double-sided tape and the like can be used as the adhesives 12 and 13.

Third Emboriment

While in the first embodiment, in the top plate 10, the concave-convex part is provided between the thin plate parts of the surface layer member 20 and the bottom side member 30, in a third embodiment, a patterned printed film is inserted as a 'patterned layer' instead of the concave-convex part. Since the external appearance of the key structure of the third embodiment is identical to that of the key structure 100, the overall external perspective view is the same as FIG. 1.

Figure 7:
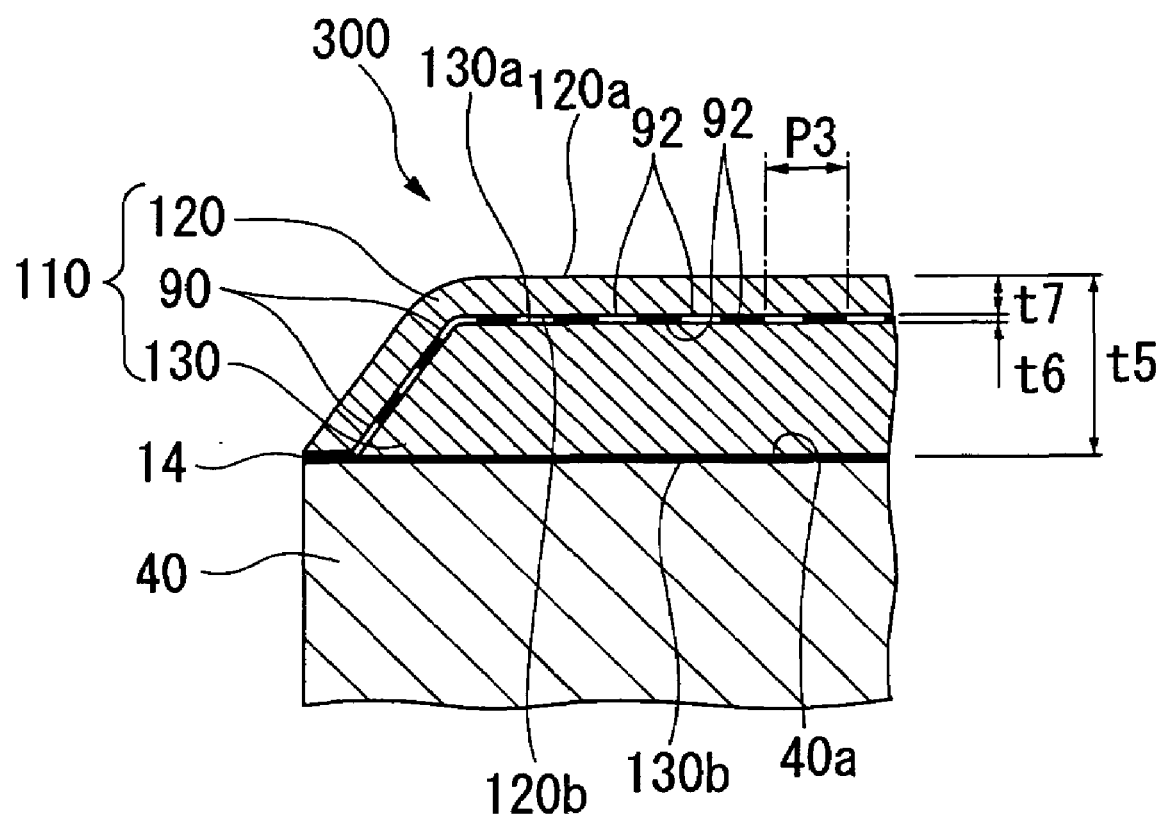
FIG. 7 is a cross sectional view showing a third embodiment of this invention, taken along the line A-A in FIG. 1.

FIG. 7 is a partial cross-sectional view of a key structure 300 according to a third embodiment of this invention taken along the line A-A of FIG. 1, and corresponds to FIG. 3B. The key structure 300 is formed by using an adhesive 14 to securely affix a top plate 110 on a key base 40.

The top plate 110 is formed on either side of a printed film 90 between a surface layer member 120 and a bottom side member 130 by a process of two-color injection molding (explained below). The surface layer member 120 is made from the same material as the surface layer member 20, is the same color, and is half-transparent. The bottom side member 130 is made from the same material as the bottom side member 30, and is a white color or the like which sufficiently reflects light. A top face 120a of the surface layer member 120 is a surface for fingering of the key structure 300.

The printed film 90 is made by printing black ink or the like on a film of transparent polyethylene terephthalate (PET) resin or the like, and consists of a transparent part 91 which alternates with a black part 92 in the key width direction. The transparent part 91 and the black part 92 extend in a straight line along the long direction of the key structure 300 in the same manner as the protrusions 22 and the concave grooves 21 (see FIG. 3B), forming a vertically-striped pattern.

Where t6 is the thickness of the printed film 90, t7 is the thickness from a rear face 120b of the surface layer member 120 to its top face 120a, and t8 is the thickness from the rear face 130b of the bottom side member 130 to the top face 120a of the surface layer member 120, these thicknesses are set as approximately t6=0.1 mm, t7=0.3 mm to 0.4 mm, and t8=1.6 mm to 1.9 mm.

In this configuration, as in the first embodiment, some of the light which is incident upon the key structure 300 from the outside passes through the surface layer member 120, is reflected by the rear face 60b of the surface layer member 120 and the bottom face and the like of the transparent part 91 of the printed film 90, passes again through the surface layer member 120 and is emitted to the outside. Due to the different transmittivities and reflection rates of the transparent part 91 and the black part 92, the transparent part 91 appears brighter than the black part 92 to the user, and the surface layer member 120 is half-transparent. Therefore, a faint and natural vertically-striped pattern which corresponds to the striped pattern formed by the transparent part 91 and the black part 92 becomes visible, and resembles the edge grain of real ivory.

Instead of the transparent part 91, a non-transparent white part may be provided in the printed film 90. Due to the different reflection rates of the white part and the black part 92, this also appears as a natural vertically-striped pattern resembling the edge grain of real ivory in the same manner as above.

A method for molding the top plate 110 will be explained. FIGS. 8A to 8D are schematic diagrams of procedures for two-color injection molding of the top plate 110. It is assumed that the printed film 90 is already manufactured by a separate process prior to this injection molding.

Figure 8A:
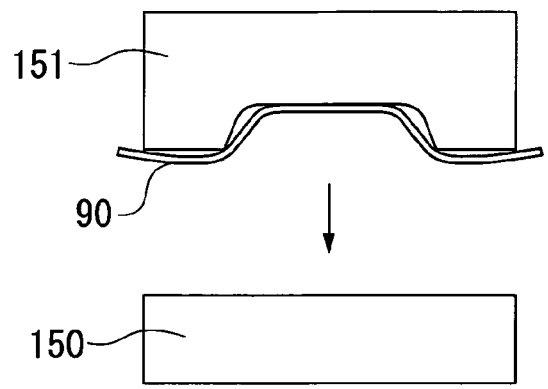
FIGS. 8A to 8D are cross-sectional views showing procedures for two-color injection molding of a top plate used in the third embodiment.
Figure 8B:
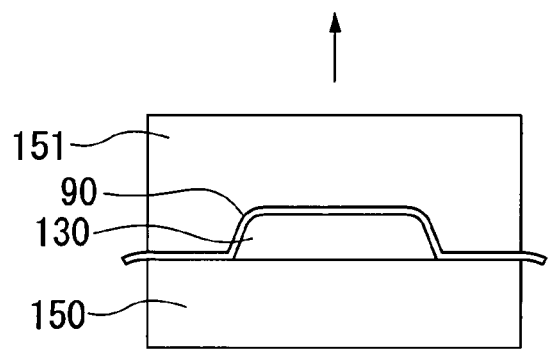

The printed film 90 is mounted on a convex part of a first movable mold 151 (FIG. 8A). A core mold 150 is aligned with the first movable mold 151, a PC molten resin is introduced into a cavity, and a primary molded component consisting of the bottom side member 130 is molded by injection molding (FIG. 8B). When the first movable mold 151 is removed, the printed film 90 is now in a state of being secured to the bottom side member 130.

Figure 8C:
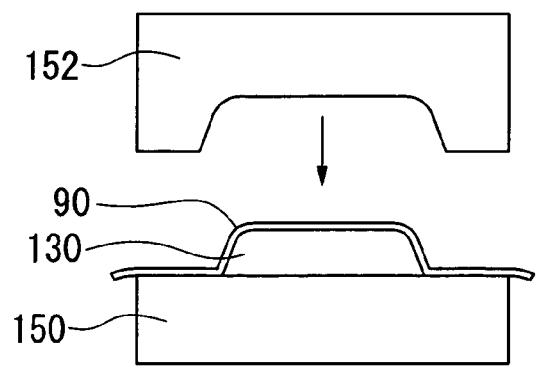

With the core mold 150 still holding the bottom side member 130 which the printed film 90 is secured to, the first movable mold 151 is replaced with a second movable mold 152 which is moved near to the core mold 50 (FIG. 8C). To facilitate this switch from the first movable mold 151 to the second movable mold 152 in this embodiment, the first movable mold 151 is provided below the core mold 150 and the second movable mold 152 is provided above it. When shifting from the state of FIG. 8B to that of FIG. 8C, the core mold 150 is rotated by 90 degrees so that its cavity side is facing upwards. The top side of FIGS. 8C and 8D is the top face side of the top plate 110.

Figure 8D:
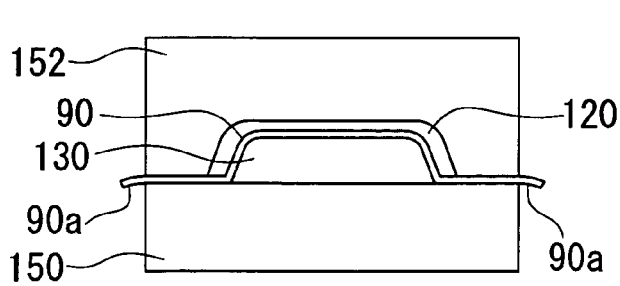

In FIG. 8D, PMMA molten resin is introduced into the cavity formed by the gap between the second movable mold 152 and the printed film 90, and a secondary molded component consisting of the surface layer member 120 is molded by injection molding. The printed film 90 is thereby secured to the surface layer member 120, and the bottom side member 130, the printed film 90, and the surface layer member 120 are joined in a single piece.

Surplus portions 90a of the printed film 90 which protrude to the left and right sides are cut away from the top plate 110 formed by this injection molding. After further predetermined post-processing, a rear face 130b of the bottom side member 130 is affixed by the adhesive 14 to the top face 40a of the key base 40, completing the key structure 300.

According to this embodiment, with regard to the sophisticated external appearance having a faint and natural pattern-resembling that of ivory and the like, similar effects to those of the first embodiment can be obtained. With the exception of the printed film 90, the top plate 110 has a highly rigid two-layer structure, and the entire rear face 130b of the bottom side member 130 is affixed to the key base 40 to achieve high adhesive strength. With regard to these points also, similar effects as those of the first embodiment can be obtained.

All that is required for the printed film 90 is to form a striped pattern having different transmittivities or reflection rates, there being no limitation on a black and transparent configuration, and any manufacturing method may be used. For example, instead of printing ink or the like, the printed film 90 may be formed using a photography technique such as positive photography.

While in this embodiment, the printed film 90 is sandwiched between the surface layer member 120 and the bottom side member 130 with the patterned layer inside the top plate 110, the configuration is not limited to this. Instead of printing the pattern on the printed film 90, it may be printed directly on either or both of the rear face 120b of the surface layer member 120 and the top face 130a of the bottom side member 130. When such a top plate is molded by injection molding, the pattern is printed on whichever of the surface layer member 120 and the bottom side member 130 which is on the primary molded component side. When securing the two members by an adhesive of the like instead of by injection molding, the pattern should be printed on both members.

When using such a configuration, other conceivable methods for printing the pattern include laser light irradiation and printing using a printing apparatus. The pattern is not limited to a flat pattern, and may be a physical or three-dimensional pattern which creates a three-dimensional external appearance by an effect such as light-polarization or refraction, such as a hologram.

Fourth Embodiment

While in the third embodiment, the patterned layer in the top plate consists of the printed film 90, in the fourth embodiment, instead of the printed film 90, a patterned layer is provided in one molding step during three-color injection molding. Since the external appearance of a key structure of the fourth embodiment is identical to that of the key structure 100, the overall external perspective view is the same as FIG. 1.

Figure 9A:
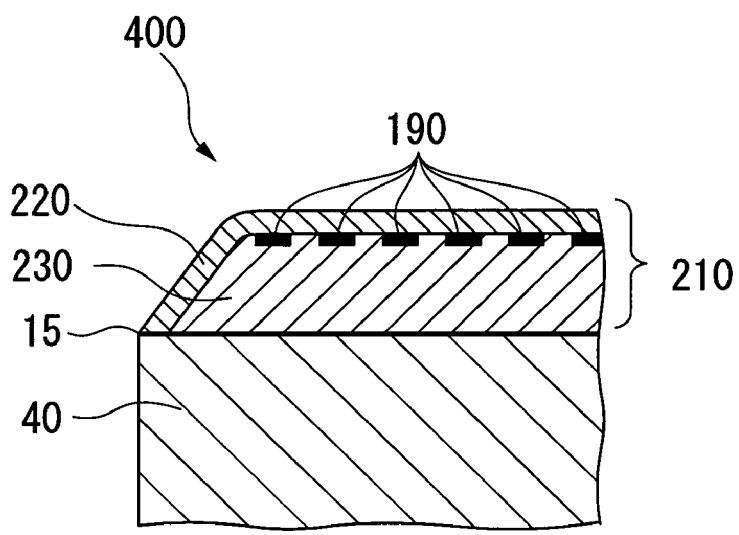
FIG. 9A is a cross-sectional view showing a key structure according to a fourth embodiment of this invention, taken along the line A-A of FIG. 1.

FIG. 9A is a partial cross-sectional view of a key structure 400 according to this embodiment taken along the line A-A of FIG. 1, and corresponds to FIG. 3B. FIG. 9B is an exploded cross-sectional view of the key structure 400. The key structure 400 is formed by using an adhesive 15 to securely affix a top plate 210 onto a key base 40.

The top plate 210 is formed using three-color injection molding, a plurality of black-line members 190 being arranged between a surface layer member 220 and a bottom side member 230. The surface layer member 220 is made from the same material as the surface layer member 20; it is the same color, and is half-transparent. The bottom side member 230 is made from the same material as the bottom side member 30, and is a white color.

Although not shown in FIGS. 9A and 9B, the top plate 210 is made by injection molding in the following manner. The bottom side member 230 is made by primary injection molding. A movable mold is then switched, and the plurality of black-line members 190 are provided on the bottom side member 230 by secondary injection molding. After switching the movable mold again, the surface layer member 220 is provided on the bottom side member 230 and the black-line members 190 are tertiary injection molding.

After predetermined-post-processing, the molded top plate 210 is affixed to the key base 40 to complete the key structure 400. In the top plate 210, for example, the black-line members 190 have the same pitch as the protrusions 31 (see FIG. 3B). The black-line members 190 are, for example, formed from PMMA resin and are black in color.

According to this embodiment, similar effects to those in the third embodiment can be obtained.

In the first and second embodiments, as a modification for achieving an external appearance which always has a faint and natural pattern similar to that of ivory and the like, the concave-convex part formed by the protrusions 22 and the concave grooves 21 (see FIG. 3B), and by the concave grooves 61 and the protrusions 62 (see FIG. 5B), may be provided in the top plates 10 and 60 excepting the surfaces for fingering or on the bottom faces of the top plates 10 and 60. The upper section, although smaller than the concave-convex part, may be made transparent, and the thicknesses t1 and t3 may be set such that the concave-convex part appears to be patterned when viewed from the surface for fingering side. That is, the top plate is not limited to a one-layer or two-layer structure, and may have three layers or more. The section of the top plate below the concave-convex part need not be transparent or half-transparent. Therefore, the first embodiment is not limited to two-color molding, and may be molded by multicolor injection molding of three colors or more. The third and fourth embodiments can also be regarded in the manner of the modification mentioned above. For example, the arrangement of the patterned layers such as the printed film 90, the directly printed pattern, the black-line members 190, and the like, can be modified in the same manner as the concave-convex part.

With specific regard to the essential object of achieving an ivory pattern, in the concave-convex part in the first embodiment, the concave parts. (the concave grooves 21 and the troughs 32) need not be completely joined to the convex parts (the protrusions 31 and 32). For example, either or both of the rear face 20b of the surface layer member 20 and the top face 30a of the bottom side member 30 may be a flat face without concavities and convexities. When the top plate is configured from three or more layers, the concave-convex part should be formed on at least one of two opposing faces of at least one pair of mutually opposing thin plate members among the plurality of laminated thin plate members.

While in the third and fourth embodiments, there are, excluding the patterned layer, two layers of thin plate members in the top plate (e.g. the surface layer member 120 and the bottom side member 130), the top plate may include three or more layers. In this case, the patterned layer should be provided between at least one pair of thin plate members which are mutually adjacent among the plurality of thin plate members.

Figure 9C:
FIG. 9C is a rear view showing a surface layer member according to an alternative example of the fourth embodiment of this invention.
Figure 9B:
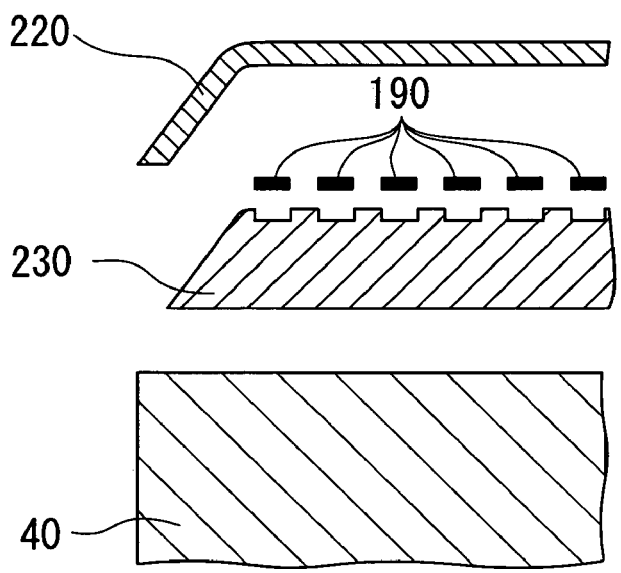
FIG. 9B is an exploded cross-sectional view of FIG. 9A.

While in the first to the fourth embodiments, the pattern perceived as the external appearance is the edge grain pattern of ivory, it can also be formed to be perceived as an ivory pattern with a sense of sophistication by making it resemble a flat grain pattern, as exemplified by the rear face of the surface layer member in the modification of FIG. 9C. The pattern is not limited to these and can be freely designed so as to obtain various types of patterns including those for decorative purposes by modifying the shape, color, and the like of the concave-convex part and the patterned layer, modifying the color, transparency level, and the like of the surface layer member and the bottom side member, and so on. For example, the color of the rear side member 30 in the first embodiment is not limited to a transparent color, and its appearance can be changed by modifying the color type and color density.

While in the first, third, and fourth embodiments, the material of the surface layer members 20, 120, and 220 is different from the material of the bottom side members 30, 130, and 230, with regard to suppressing deformation of the key structure and maintaining durability they should preferably consist of similar materials or the same material. At the very least, both should preferably have similar warpage characteristics or low warpage; in the first embodiment, they should preferably have high mutual adhesion strength.

Incidentally, while the embodiments describe a wooden key base 40, it should be a member made from wooden appearance in order to obtain a sense of sophistication. With regard to the essential aim of making the top plate resemble ivory, the key base 40 could be made from resin. In that case, the overall key structure including the top plate 10 and the key base 40 can be manufactured by multicolor injection molding only, without need for an adhesion step or the like, simplifying its manufacture and reducing costs.

While in the first to the fourth embodiments, the key structure is applied in a white key, it can also be applied in a black key.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A key structure for a keyboard apparatus comprising:
   a key base which is key-shaped in plan view;
   a resin top plate which has a surface for fingering of the resin top plate and is secured on a top face of the key base; and
   a striped patterning layer formed in a section of the resin top plate between the surface for fingering and the top face of the key base in which portions having different reflectance properties with respect to light incident on the surface for fingering are alternately arranged;
   at least a section of the resin top plate above the striped patterning layer being half-transparent, such that the striped patterning layer can be perceived as a pattern from the surface for fingering side.

2. The key structure according to claim 1, wherein a concave-convex part is formed as the striped patterning layer.

3. The key structure according to claim 2, wherein the concave-convex part is formed on an opposing face of the resin top plate opposite the key base.

4. The key structure according to claim 2, wherein the resin top plate is formed by laminating a plurality of thin plate members, and the concave-convex part is formed on at least one of two opposing faces of at least one pair of mutually opposing thin plate members among the plurality of thin plate members.

5. The key structure according to claim 1, wherein a patterned film is formed as the striped patterning layer.

6. The key structure according to claim 5, wherein the resin top plate is formed by laminating a plurality of thin plate members, and the patterned film is inserted between at least one pair of mutually opposing thin plate members among the plurality of thin plate members.

7. The key structure according to claim 1, wherein alternative protrusions and concave grooves are formed as the striped patterning layer.

8. The key structure according to claim 1, wherein a plurality of hollow portions are formed as the striped patterning layer.

9. The key structure according to claim 1, wherein the section of the resin top plate above the striped patterning layer is laminated on the striped patterning layer.

\* \* \* \* \*